United States Patent [19]

Kokubu et al.

[11] Patent Number: 4,640,900
[45] Date of Patent: Feb. 3, 1987

[54] LOW EXPANSION GLASS

[75] Inventors: Yoshinori Kokubu, Tokyo; Makoto Moriyasu, Yokohama, both of Japan

[73] Assignee: Asahi Glass Company, Ltd., Tokyo, Japan

[21] Appl. No.: 635,268

[22] Filed: Jul. 27, 1984

[30] Foreign Application Priority Data

Aug. 16, 1983 [JP] Japan ................................ 58-148808

[51] Int. Cl.⁴ ...................... B32B 17/06; C03C 3/093; G03F 9/00
[52] U.S. Cl. ........................................ 501/67; 65/134; 428/428; 430/5; 501/56; 501/57; 501/59; 501/61; 501/62
[58] Field of Search ....................... 501/57, 56, 59, 61, 501/62, 67, 66; 430/5; 428/428

[56] References Cited

U.S. PATENT DOCUMENTS

| | | | |
|---|---|---|---|
| 3,485,644 | 12/1969 | Shonebarger | 501/61 |
| 3,728,646 | 4/1973 | Zijlstra | 501/66 |
| 4,038,491 | 7/1977 | Gamble et al. | 501/66 |
| 4,319,215 | 3/1982 | Yamazaki et al. | 501/67 |
| 4,391,916 | 7/1983 | Nakagawa et al. | 501/57 |
| 4,501,819 | 2/1985 | Yatsuda et al. | 501/61 |
| 4,554,259 | 11/1985 | Franklin et al. | 501/67 |
| 4,567,104 | 1/1986 | Wu | 501/56 |

FOREIGN PATENT DOCUMENTS 51-57165  5/1976  Japan ................................... 501/67
1338386  11/1973  United Kingdom .

OTHER PUBLICATIONS

Izumitani, T., et al., "Surface Texture Problems of High Precision Glass Substrates for Photomasks"–Hoya Optics, Menlo Park, Calif. (1976), pp. 1–10.
Ceramic Industry–Jan. 1983, vol. 120(1), "Salt Cake", p. 111.

Primary Examiner—Helen M. McCarthy
Attorney, Agent, or Firm—Oblon, Fisher, Spivak, McClelland & Maier

[57] ABSTRACT

A low expansion glass comprising, all by weight, from 55 to 65% of $SiO_2$, from 10 to 20% of $Al_2O_3$, from 2 to 10% of $B_2O_3$, from 3 to 10% of MgO, from 1 to 8% of CaO, from 2 to 10% of ZnO, from 0 to 4% of $R_2O$ where R is an alkali metal atom, and from 0 to 4% of $ZrO_2$.

2 Claims, No Drawings

LOW EXPANSION GLASS

BACKGROUND OF THE INVENTION

1. Field of the Invention

The present invention relates to a low expansion glass useful as photoetching transparent masks to be used for the preparation of semiconductor integrated circuits or as glass substrates for various displays, etc.

2. Description of the Prior Art

Reflecting the increasing trend for higher integration of integrated circuit devices, the glass substrates for photoetching masks are required to be dimensionally stable without undergoing any change with time and to have high heat and chemical resistance as well as excellent thermal shock resistance. On the other hand, from the aspect of the production, such glass substrates are required to be made of a composition which has excellent melting and forming characteristics in order to avoid the formation of bubbles or striae or inclusion of fine foreign matters. As typical examples of the low expansion glass, there may be mentioned quartz glass and pyrex glass. However, these materials have a high viscosity at a high temperature, and it is difficult to melt them. In particular, it is difficult to eliminate the formation of bubbles. For the glass substrates for photoetching masks, even the presence of bubbles or foreign matters as small as a few microns can be a fatal defect. Whereas, soda-lime silica glass containing an alkali metal oxide or an alkaline earth metal oxide has a low viscosity at a high temperature. However, it has a high thermal expansion coefficient and has poor chemical resistance.

A variety of glass plates for photoetching masks have been known. However, it used to be difficult to obtain a glass plate which fully satisfies all the requirements for low expansion characteristics, high chemical resistance and good melting characteristics.

SUMMARY OF THE INVENTION

An object of the present invention is to provide a low expansion transparent glass having a high-temperature viscosity and devitrification temperature suitable for melting and forming the glass, being free from inclusions and bubbles and having excellent heat resistance, thermal shock resistance and chemical resistance, and thus suitable for use as a substrate for an electro optical device such as a photoetching mask, a display device or a solar cell, for instance, a low expansion glass having an expansion coefficient of from 30 to $45 \times 10^{-7}/°C$.

Namely, the present invention provides a low expansion glass comprising, all by weight, (a) from 55 to 65%, preferably from 58 to 63%, of $SiO_2$, (b) from 10 to 20%, preferably from 12 to 15%, of $Al_2O_3$, (c) from 2 to 10%, preferably from 3 to 5%, of $B_2O_3$, (d) from 3 to 10%, preferably from 5 to 8%, of MgO, (e) from 1 to 8%, preferably from 2 to 5%, of CaO, (f) from 2 to 10%, preferably from 5 to 9%, of ZnO, (g) from 1 to 4%, preferably from 1 to 3%, of $R_2O$ where R is an alkali metal, and (h) from 0.1 to 4%, preferably from 0.1 to 2%, of $ZrO_2$.

DETAILED DESCRIPTION OF THE PREFERRED EMBODIMENTS

The low expansion glass of the present invention may further contain at most 0.5% by weight of at least one component selected from the group consisting of $Cl_2$, $F_2$, $Sb_2O_3$, $As_2O_3$ and $SO_3$.

Further, in the low expansion glass of the present invention, MgO, CaO and ZnO may partially be substituted by at most 3% by weight of BaO, SrO or PbO.

Now, the reasons for the limitations of the contents of the respective components for the low expansion glass of the present invention will be given below:

(a) $SiO_2$: If the amount is less than 55% by weight (hereinafter referred to simply as "%"), vitrification tends to be difficult. On the other hand, if the amount exceeds 65%, the glass tends to have high viscosity, and it becomes difficult to melt it.

(b) $Al_2O_3$: This is used as a substitute for $SiO_2$ and has an effect to reduce the viscosity without increasing the expansion coefficient. If the amount is less than 10%, $SiO_2$ tends to be too much, and the viscosity tends to be too high. On the other hand, if the amount exceeds 20%, crystals of $MgO-Al_2O_3-SiO_2$ tend to precipitate, whereby the devitrification temperature rises.

(c) $B_2O_3$: This is a component capable of reducing the viscosity and is required to maintain the good melting characteristics. However, if the amount is less than 2%, no adequate effect will be obtainable. If the amount exceeds 10%, the chemcial durability of the glass tends to be deteriorated.

(d) MgO: This component serves to reduce the viscosity without increasing the expansion coefficient very much. If the amount is less than 3%, no adequate reduction of the viscosity will be obtainable. On the other hand, if the amount exceeds 10%, crystals of $MgO-Al_2O_3-SiO_2$ tend to precipitate, whereby the devitrification temperature will be too high.

(e) CaO: This component has an effect to suppress the devitrification. If the amount is less than 1%, no adequate effect is obtainable, and if the amount exceeds 8%, the expansion coefficient tends to be too great.

(f) ZnO: This component has an equal function as MgO. However, if the amount is less than 2%, no substantial effect will be obtained, and if the amount exceeds 10%, devitrification is likely to be brought about due to the precipitation of $ZnO-Al_2O$.

(g) $R_2O$: This component serves to reduce the viscosity, increase the reactivity and improve the melting characteristics of the glass. However, if the amount is less than 1%, no adequate effect will be obtained, and if the amount exceeds 4%, the expansion coefficient tends to be too great, and the water resistance tends to be deteriorated.

(h) $ZrO_2$: This component has an effect to reduce the thermal expansion coefficient and to improve the durability. However, if the amount exceeds 4%, it tends to increase the viscosity, and the stability of the glass tends to be deteriorated. If the amount is less than 0.1%, no adequate effect is obtainable.

(i) $Cl_2$, $F_2$, $Sb_2O_3$, $As_2O_3$ and $SO_3$: These components are added as refining agent. If the amount exceed 0.5%, the chemical durability tends to be deteriorated.

(j) BaO, SrO and PbO: These components may be used as substitutes for MgO, CaO and ZnO. However, if the amount exceeds 3%, it is likely that a problem such as coloring will result.

By the above composition, it is possible to obtain a low expansion glass having an expansion coefficient of from 30 to $45 \times 10^{-7}/°C$. Further, it is possible to minimize the formation of bubbles or striae by improving the melting characteristics by adjusting the softening point to a level of not higher than 930° C. and the melting temperature, e.g. the temperature of log $\eta=2$ to a level of not higher than 1630° C. and the temperature of log $\eta=4$ to a level of not higher than 1230° C.

Now, the present invention will be described in further detail with reference to Examples. However, it should be understood that the present invention is by no means restricted to these specific Examples.

EXAMPLES 1 to 6 and COMPARATIVE EXAMPLES 7 and 8:

The starting materials were weighed to obtain the glass compositions as identified in Table 1, and mixed by a small size mixer. The mixtures were melted by means of platinum crucibles at a temperature of from 1500° to 1550° C. for from 3 to 4 hours. In an intermediate point, the mixtures were stirred with a platinum stirrer for from 1 to 2 hours to make them homogeneous. Then, the mixtures were poured to obtain glass samples. With respect to the molten mixtures and the glass samples thereby obtained, the expansion coefficients, the softening points, the high temperature viscosity coefficients, the water resistance (by a Soxhlet method), the acid resistance (by a surface treating method with 5% HCl at 100° C. for 2 hours) and the devitrification temperature (by a temperature gradient furnace method) were measured. The results are shown in Table 1.

TABLE 1

| Examples | 1 | 2 | 3 | 4 | 5 | 6 | Comparative Examples 7 | 8 |
|---|---|---|---|---|---|---|---|---|
| Composition (% by weight) | | | | | | | | |
| $SiO_2$ | 62.0 | 62.0 | 58.5 | 65.0 | 61.0 | 59.0 | 50.0 | 78.4 |
| $Al_2O_3$ | 14.0 | 14.5 | 14.5 | 10.0 | 14.5 | 15.0 | 14.0 | 4.0 |
| $B_2O_3$ | 4.5 | 4.0 | 6.7 | 7.0 | 7.0 | 6.9 | 1.0 | 11.0 |
| MgO | 7.0 | 7.5 | 6.9 | 10.0 | 10.0 | 5.0 | 5.0 | 0.1 |
| CaO | 3.5 | 3.7 | 1.9 | 1.0 | 1.0 | 4.5 | 5.5 | 2.0 |
| ZnO | 7.0 | 6.0 | 4.8 | 5.5 | 5.0 | 5.0 | 0 | 0 |
| $Na_2O$ | 1.0 | 2.0 | 1.5 | 1.5 | 1.5 | 2.5 | 0.5 | 4.5 |
| $R_2O$ | | | | | | | | |
| $K_2O$ | 0.7 | 0.3 | 0.3 | — | — | — | 0 | 0 |
| $ZrO_2$ | 0.3 | 0.1 | 0.2 | 0.1 | 0.1 | 0.1 | 0.1 | 0.2 |
| Other components | — | — | BaO 2.6 SrO 1.8 $Sb_2O_3$ 0.3 | — | — | SrO 2.0 | BaO 24.0 | — |
| Expansion coefficient $\times 10^{-7}/°C$. (50-350° C.) | 39 | 40 | 40 | 37 | 36 | 44 | 47 | 35 |
| Softening point | 904 | 896 | 865 | 890 | 920 | 900 | 1000 | 820 |
| Viscosity coefficient (°C.) | | | | | | | | |
| log n = 2 | 1570 | 1585 | 1594 | 1610 | 1610 | 1600 | 1680 | 1825 |
| log n = 4 | 1190 | 1203 | 1191 | 1213 | 1200 | 1185 | 1250 | 1230 |
| Water resistance (%) | 0.05 | 0.06 | 0.07 | 0.03 | 0.07 | 0.03 | 0.03 | 0.05 |
| Acid resistance mg/cm² | 0.03 | 0.025 | 0.05 | 0.06 | 0.3 | 0.2 | 0.5 | 0.2 |
| Devitrification temperature (°C.) | 1200 | 1190 | 1170 | 1260 | 1230 | 1200 | 1260 | 1230 |
| Melting characteristics[1] | 5 | 5 | 7 | 10 | 8 | 5 | 80 | 1000 |
| Forming characteristics[2] | O | O | O | O | O | O | O | O |

[1] Number of bubbles/kg after melting at 1600° C. for 4 hours subsequent to the batch chargings of 4 times/1 hr. (molten glass: 300 g; refining agent: NaCl + $Na_2SO_4$)
[2] Glass sheet can be rolled out continuously without devitrification (1 hr.).

It is evident from Table 1 that the glass samples obtained in the Examples of the present invention had a thermal expansion coefficient as low as from 35 to $45 \times 10^{-7}/°C.$, low softening and devitrification temperatures and a relatively low melting temperature ($10^2$ poise) of a level of not higher than 1630° C., whereby the melting can easily be conducted, and it is possible to mold a glass substrate with minimum formation of bubbles or striae. Further, the glass samples had excellent water resistance and acid resistance. They can be formed without devitrification by a continuous roll out mold process.

Comparative Examples 7 and 8 had difficulties that the obtained samples had a high viscosity, and it was difficult to melt them, although they had satisfactory water resistance and acid resistance.

Thus, low expansion glass of the present invention is adequately durable against a strong acid to be used for the washing treatment or resist-removing operation when used as a substrate for a photoetching mask. Further, its thermal expansion coefficient is relatively small, and it does not undergo a dimensional change with time and can be used for a long period of time. Since it contains little bubbles or striae, it is possible to attain high precision masking. When a chromium or other metal coating is formed thereon, the coating film will be adequately durable, since the glass of the present invention has a low alkaline nature.

Thus, the low expansion glass of the present invention is most suitable as a glass substrate for a photoetching mask.

The glass of the present invention is useful not only as glass substrates for photoetching masks but also as glass substrates for various display devices, solar cells or face plates, or as glass plates for other purposes.

What is claimed is:

1. A low expansion transparent glass substrate consisting of, all by weight, from 55 to 65% of $SiO_2$, from 10 to 20% of $Al_2O_3$, from 2 to 10% of $B_2O_3$, from 3 to 10% of MgO, from 1 to 8% CaO, from 2 to 10% of ZnO, from 1 to 4% of $R_2O$ where R is an alkali metal atom and of which at least 1% is $Na_2O$, from 0.1 to 4% of $ZrO_2$, from 0 to 5% of at least one component of refining agent selected from the group consisting of $Cl_2$, $F_2$, $Sb_2O_3$ and $As_2O_3$, and $SO_3$, and from 0 to 3% of R'O where R' is alkaline earth metal atom selected from Ba, Sr and Pb, and said low expansion transparent glass substrate has an expansion coefficient of from 30 to $45 \times 10^{-7}/°C.$ (from 50° to 350° C.), said glass having a temperature at the softening point of from about 890° C. to not higher than 930° C.

2. The low expansion transparent glass substrate according to claim 1, which consists of, all by weight, from 58 to 63% of $SiO_2$, from 12 to 15% of $Al_2O_3$, from 3 to 5% of $B_2O_3$, from 5 to 8% of MgO, from 2 to 5% of CaO, from 5 to 9% of ZnO, from 1 to 3% of $R_2O$ of which at least 1% is $Na_2O$, and from 0.1 to 2% of $ZrO_2$.

* * * * *